US012694542B2

(12) United States Patent
Okayama et al.

(10) Patent No.: US 12,694,542 B2
(45) Date of Patent: Jul. 28, 2026

(54) MARK DETECTION METHOD AND COMPUTER PROGRAM

(71) Applicant: SCREEN Holdings Co., Ltd., Kyoto (JP)

(72) Inventors: Toshiyuki Okayama, Kyoto (JP); Yoshinori Shimada, Kyoto (JP)

(73) Assignee: SCREEN Holdings Co., Ltd., Kyoto (JP)

(*) Notice: Subject to any disclaimer, the term of this patent is extended or adjusted under 35 U.S.C. 154(b) by 280 days.

(21) Appl. No.: 18/473,109

(22) Filed: Sep. 22, 2023

(65) Prior Publication Data

US 2024/0104753 A1     Mar. 28, 2024

(30) Foreign Application Priority Data

Sep. 26, 2022     (JP) ................................. 2022-152267

(51) Int. Cl.
    *G06T 7/33*          (2017.01)
    *G06T 9/20*          (2006.01)
(52) U.S. Cl.
    CPC .................. *G06T 7/33* (2017.01); *G06T 9/20* (2013.01); *G06T 2207/20081* (2013.01)
(58) Field of Classification Search
    CPC ... G06T 7/33; G06T 9/20; G06T 2207/20081; G06T 2207/30204; G06V 2201/06; G06V 10/24; G06V 10/82; G06V 10/245; H01L 21/68; H01L 21/681; H01L 21/67259; H01L 21/67; H01L 21/67282; G06F 18/24; G06N 20/00
    See application file for complete search history.

(56) References Cited

U.S. PATENT DOCUMENTS 5,696,838 A      12/1997  Chiu et al.
12,067,732 B2 *   8/2024  Carreira ................ G06N 3/088
                  (Continued)

FOREIGN PATENT DOCUMENTS

EP        3889684 A1      10/2021
JP        H06-333054 A    12/1994
                  (Continued)

OTHER PUBLICATIONS

Office Action and Search Report dated Apr. 29, 2024 in corresponding Taiwanese Patent Application No. 112122097.
                  (Continued)

*Primary Examiner* — Stephen R Koziol
*Assistant Examiner* — Benedict E Lee
(74) *Attorney, Agent, or Firm* — OSTROLENK FABER LLP

(57)          ABSTRACT

An encoding step and an image selection step are performed by a computer 20. In the encoding step, a plurality of partial images D2 of an object are input to a learned VAE model M, and the plurality of partial images D2 are encoded to a plurality of latent variables in a multi-dimensional latent space. In the image selection step, one or more partial images D2 that are likely to include an alignment mark are selected on the basis of a distribution of the plurality of latent variables in the latent space. Thus, a partial image that is likely to include an alignment mark is automatically detected by the computer 20 with the use of the VAE model M. This can lighten a burden on an operator who searches for an alignment mark.

8 Claims, 10 Drawing Sheets

(56)           References Cited

U.S. PATENT DOCUMENTS

| | | | |
|---|---|---|---|
| 12,271,114 B2 * | 4/2025 | Middlebrooks | G03F 7/70616 |
| 12,360,994 B2 * | 7/2025 | Ikeda | G06F 17/16 |
| 2019/0287230 A1 | 9/2019 | Lu et al. | |
| 2020/0074611 A1 | 3/2020 | Dou et al. | |
| 2020/0133144 A1 | 4/2020 | Schmitt-Weaver et al. | |
| 2020/0265576 A1 | 8/2020 | Sasaki | |
| 2021/0232872 A1 | 7/2021 | Ries et al. | |
| 2021/0272298 A1 | 9/2021 | Leonard et al. | |
| 2021/0383524 A1 | 12/2021 | Dou et al. | |
| 2022/0130028 A1 | 4/2022 | Jimbo et al. | |
| 2022/0187713 A1 | 6/2022 | Middlebrooks et al. | |
| 2024/0152060 A1 * | 5/2024 | Helfenstein | G06N 3/09 |

FOREIGN PATENT DOCUMENTS

| | | | | |
|---|---|---|---|---|
| JP | 2020-522727 A | 7/2020 | | |
| JP | 2022-068832 A | 5/2022 | | |
| KR | 102080145 B1 * | 2/2020 | | G06T 7/70 |
| KR | 10-2020-0099977 A | 8/2020 | | |
| KR | 10-2020-0123853 A | 10/2020 | | |
| KR | 20220076260 A * | 6/2022 | | G06T 5/50 |
| KR | 10-2022-0128662 A | 9/2022 | | |
| TW | 202011017 A | 3/2020 | | |
| TW | 202136760 A | 10/2021 | | |

OTHER PUBLICATIONS

Extended European Search Report dated Jan. 25, 2024, issued in corresponding European Patent Application No. 23198880.9.
Tongwha Kim et al: "Advances in machine learning and deep learning applications towards wafer map defect recognition and classification: a review", Journal of Intelligent Manufacturing, [Online] vol. 34, No. 8, Aug. 23, 2022, pp. 3215-3247, XP093118358.
Written Decision on Registration dated Aug. 18, 2025, issued in corresponding Korean Patent Application No. 10-2023-0096258.

* cited by examiner

LS

MARK DETECTION METHOD AND COMPUTER PROGRAM

RELATED APPLICATIONS

This application claims the benefit of Japanese Application No. 2022-152267, filed on Sep. 26, 2022, the disclosure of which is incorporated by reference herein.

BACKGROUND OF THE INVENTION

Field of the Invention

The present invention relates to a technology for detecting an alignment mark from an object.

Description of the Background Art

Background Art

Conventionally, in an apparatus that performs fine processing on an object, such as a semiconductor manufacturing apparatus, the object is aligned on the basis of an alignment mark placed on the object. The conventional technology for aligning an object using an alignment mark is described in Japanese Patent Application Laid-Open No. 2022-068832, for example.

In this type of apparatus, for alignment of an object, conventionally, an operator visually searches for an alignment mark while enlarging an image of the object. However, such a conventional method takes time to set an alignment mark and puts a significant burden on the operator.

SUMMARY OF THE INVENTION

The present invention has been devised in view of the above-described circumstances, and it is an object to provide a technology that can lighten a burden on an operator who searches for an alignment mark.

To solve the above-described problem, the first invention of the present application is directed to a mark detection method for detecting an alignment mark from an object, executed by the computer, the method comprising the steps of: an encoding step of inputting a plurality of partial images of the object to a learned VAE model and encoding the plurality of partial images to a plurality of latent variables in a multi-dimensional latent space; and an image selection step of selecting one or more partial images that are likely to include the alignment mark on the basis of a distribution of the plurality of latent variables in the latent space.

According to the second invention of the present application, in the mark detection method according to the first invention, the image selection step includes steps of: a) calculating a distance from each of the latent variables to a nearest latent variable in the latent space; and b) selecting one or a predetermined number of partial images corresponding to one or a predetermined number of latent variables each having the distance larger than those of the other latent variables, as the one or more partial images that are likely to include the alignment mark.

According to the third invention of the present application, in the mark detection method according to the first invention or the second invention, further comprising the step of a partial-image extraction step of extracting a partial image including a characteristic shape from an image of the object, before the encoding step, and wherein in the encoding step, the partial image extracted in the partial-image extraction step is input to the VAE model.

According to the fourth invention of the present application, in the mark detection method according to any of the first to third inventions, further comprising the step of an image removal step of removing a partial image including a probe mark, a flaw, or a particle from the plurality of partial images by using a classifier created by supervised learning.

According to the fifth invention of the present application, in the mark detection method according to any of the first to fourth inventions, further comprising the step of a learning step of constructing or updating the VAE model by machine learning, and wherein in the learning step, an input image of the object for learning is input to the VAE model, and a parameter of the VAE model is adjusted such that a difference between the input image and a re-constructed image decoded from the latent variables is reduced and the distribution of the latent variables in the latent space forms a predetermined probability distribution.

According to the sixth invention of the present application, in the mark detection method according to the fifth invention, the learning step includes the steps of: a pre-adjustment learning step of performing machine learning with a first dimensionality being set as a dimensionality of the latent space; a dimensionality adjustment step of changing the dimensionality of the latent space to a second dimensionality smaller than the first dimensionality on the basis of a distribution of the latent variables in each dimension of the latent space, after the pre-adjustment learning step; and a post-adjustment learning step of performing machine learning with the second dimensionality being set as the dimensionality of the latent space.

According to the seventh invention of the present application, in the mark detection method according to the sixth invention, in the dimensionality adjustment step, the dimensionality of the latent space is reduced on the basis of variance or standard deviation calculated for each component of the plurality of latent variables in the latent space.

According to the eighth invention of the present application, in the mark detection method according to any of the fifth to seventh inventions, the learning step includes the steps of: a first learning step of performing machine learning on the basis of a first input image; an effective-component designation step of designating a predetermined number of effective components having large standard deviation or variance from among a plurality of components of the latent variables in the latent space, after the first learning step; a corrected-image generation step of decoding an effective vector having a value only for the effective component, to generate a corrected image; an input-image correction step of blending the first input image with the corrected image, to generate a second input image; and a second learning step of performing machine learning on the basis of the second input image.

The ninth invention of the present application is directed to a computer program that causes the computer to execute the mark detection method according to any of the first to eighth inventions.

According to the first to ninth inventions of the present application, partial images that are likely to include the alignment mark is automatically detected by the computer with the use of the VAE model. This can lighten a burden on an operator who searches for the alignment mark.

Especially, according to the second invention of the present application, partial images having few similar features are selected on the basis of a distance between the latent variables. This enables appropriate selection of partial images that are likely to include the alignment mark.

Especially, according to the third invention of the present application, a partial image including a characteristic shape is extracted in advance, and the extracted partial image is input to the VAE model. This can reduce the number of partial images to be input to the VAE model. Consequently, processes in the encoding step and the image selection step can be speeded up.

Especially, according to the fourth invention of the present application, a partial image including a probe mark, a flaw, or a particle can be prevented from being selected. This can improve the accuracy of detecting the alignment mark.

Especially, according to the sixth invention of the present application, the dimensionality of the latent space can be adjusted to an appropriate dimensionality. Consequently, processes in the encoding step and the image selection step can be speeded up.

Especially, according to the eighth invention of the present application, a corrected image is generated on the basis of the effective vector that has a value only for the effective component that captures the feature of the first input image, and the corrected image is blended into the first input image. As a result, the second input image in which the characteristic element of the first input image is emphasized can be generated. Then, machine learning is performed on the basis of the second input image, and thus, a more accurate VAE model can be constructed. Consequently, the alignment mark can be detected with higher accuracy.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, a preferred embodiment of the present invention will be described with reference to the drawings.

<1. Configuration of Inspection Apparatus>

Figure 1:
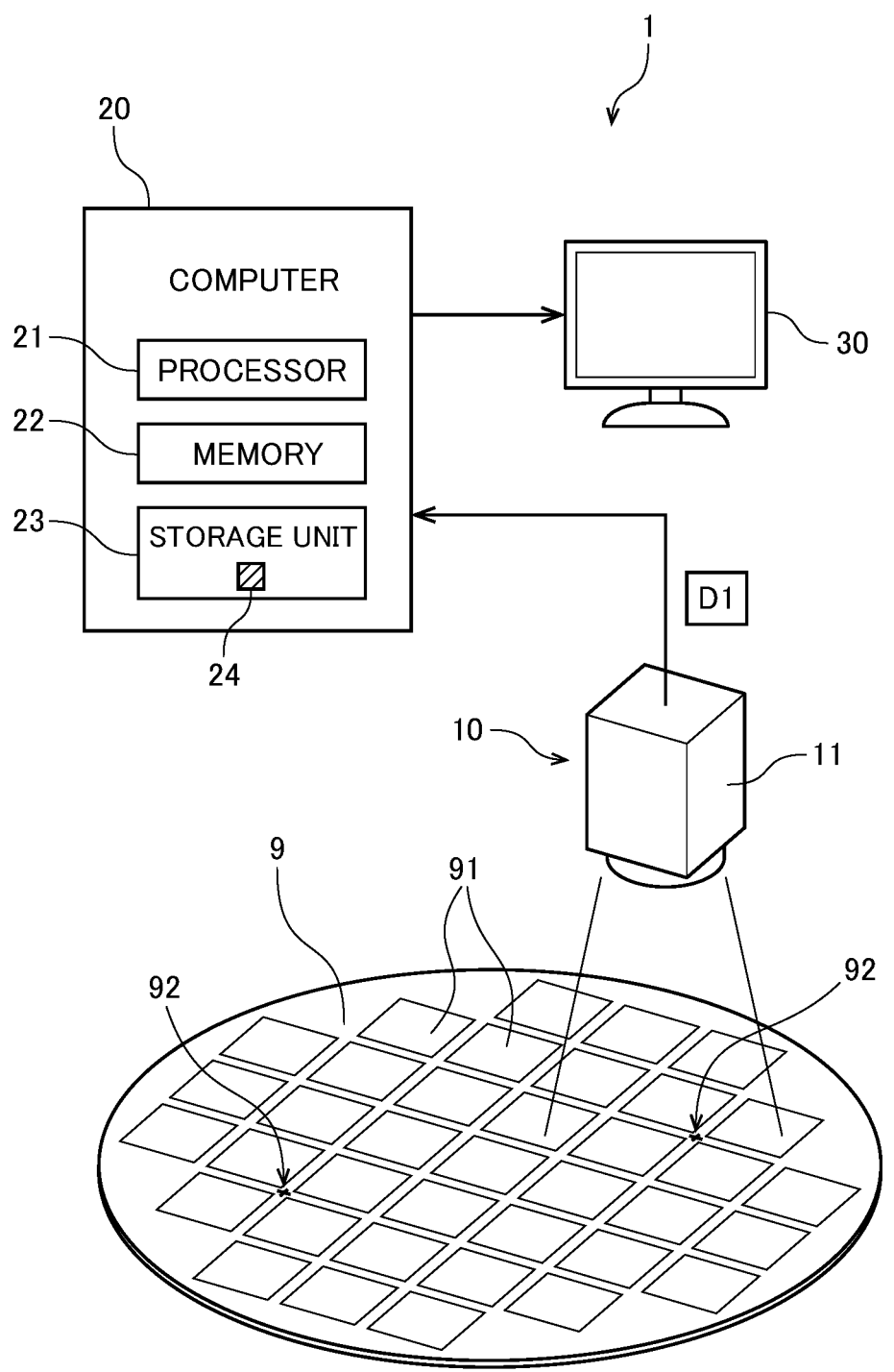
FIG. 1 is a view showing a configuration of an inspection apparatus.

FIG. 1 is a view showing a configuration of an inspection apparatus 1. The inspection apparatus 1 is an apparatus that inspects an object 9 while executing a mark detection method according to one preferred embodiment of the present invention. The object 9 is, for example, a semiconductor substrate. Alternatively, the object 9 may be a glass substrate used in a flat panel display such as a liquid crystal display device. Further, the object 9 may be another precision electronic component such as a print circuit board or a battery component. Moreover, the object 9 may be a sheet-like base material such as printing paper.

As shown in FIG. 1, the inspection apparatus 1 includes an image capture unit 10, a computer 20, and a display unit 30.

The image capture unit 10 includes a camera 11 configured to photograph the object 9. The camera 11 includes an imaging element such as a CCD or a CMOS and an optical system that forms an image of light incident from the object 9, on the imaging element. Further, the image capture unit 10 may include an illumination device that emits light to the object 9 at the time of photographing. The image capture unit 10 is electrically connected to the computer 20.

As shown in FIG. 1, a to-be-inspected pattern 91 such as a wiring pattern is formed in a surface of the object 9. Further, an alignment mark 92 is placed on the surface of the object 9. The alignment mark 92 is a mark for aligning the plurality of objects 9 in the inspection apparatus 1 in order to inspect the objects 9 at the same position. The image capture unit 10 captures images of the to-be-inspected pattern 91 and the alignment mark 92. As a result, a photographed image D1 including the to-be-inspected pattern 91 and the alignment mark 92 is acquired. The photographed image D1 is data in which many pixels are arranged on two-dimensional coordinates and a luminance value of each pixel is determined. The image capture unit 10 inputs the photographed image D1 acquired by photographing, to the computer 20.

The computer 20 is an information processing apparatus that aligns the object 9 and inspects the object 9 on the basis of the photographed image D1 input from the image capture unit 10. As shown in FIG. 1, the computer 20 includes a processor 21 such as a CPU, a memory 22 such as a RAM, and a storage unit 23 such as a hard disk drive.

In the storage unit 23, a computer program 24 that causes the computer 20 to perform a learning process, a process of detecting the alignment mark 92, an alignment process, and an inspection process that will be described later is stored. The computer program 24 is read from a storage medium readable by the computer 20, such as a CD or a DVD, and is stored in the storage unit 23. Alternatively, the computer program 24 may be one that is downloaded to the computer 20 via a network.

The display unit 30 is a device configured to display various kinds of information regarding the processes of the inspection apparatus 1. For the display unit 30, for example, a liquid crystal display device is used. The display unit 30 is electrically connected to the computer 20. The display unit 30 displays information output from the computer 20, on a screen. The information displayed in the display unit 30 includes, for example, a result of detection of the alignment mark 92 and a result of inspection of the object 9 that will be described later.

Figure 2:
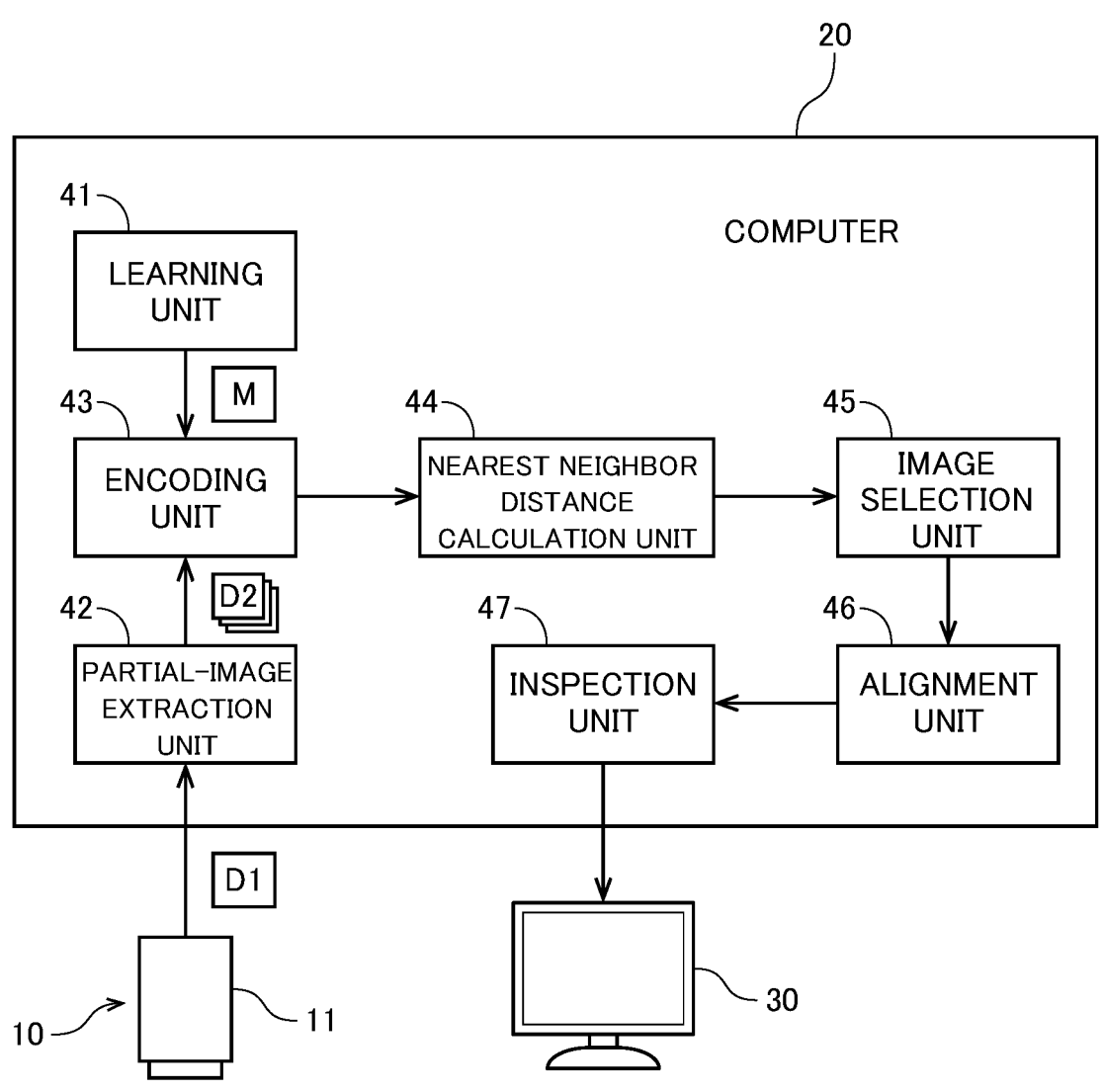
FIG. 2 is a block diagram conceptually showing functions of a computer.

FIG. 2 is a block diagram conceptually showing the functions of the above-described computer 20. As shown in FIG. 2, the computer 20 includes a learning unit 41, a partial-image extraction unit 42, an encoding unit 43, a nearest neighbor distance calculation unit 44, an image selection unit 45, an alignment unit 46, and an inspection unit 47. The respective functions of the learning unit 41, the partial-image extraction unit 42, the encoding unit 43, the nearest neighbor distance calculation unit 44, the image selection unit 45, the alignment unit 46, and the inspection unit 47 are performed when the processor 21 of the computer 20 operates in accordance with the computer program 24. Those functions of the respective components will be described below, together with a process flow.

<2. Learning Process>

First, a learning process performed in advance before an inspection process in the inspection apparatus 1 will be described.

Figure 3:
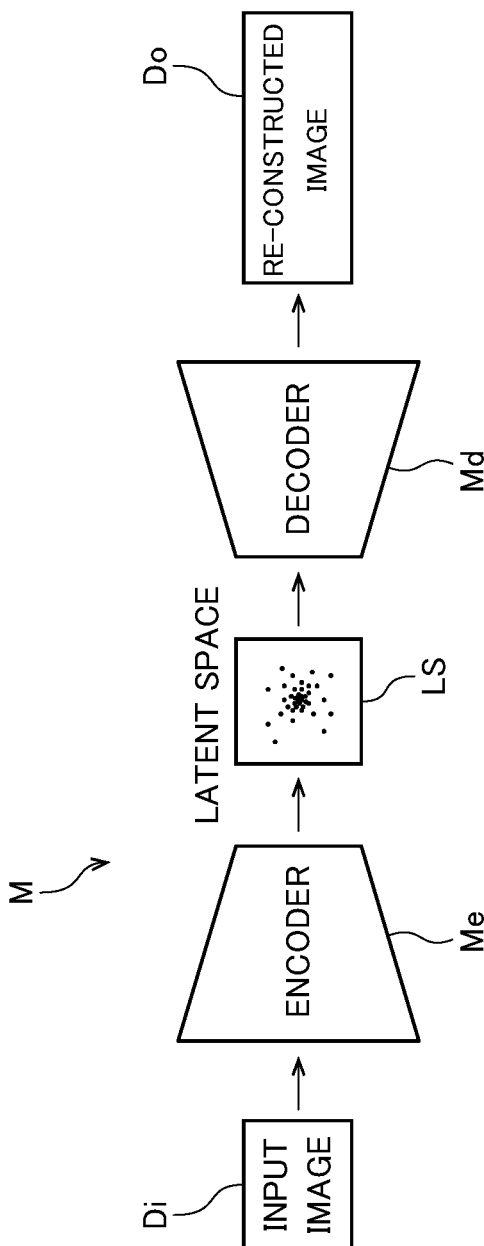
FIG. 3 is a view conceptually showing a VAE model.

The learning process is a process of constructing a variational auto encoder (VAE) model M by machine learning. FIG. 3 is a view conceptually showing the VAE model M. The VAE model M is a learning model that encodes and decodes an input image Di, to output a re-constructed image Do.

As shown in FIG. 3, the VAE model M includes an encoder Me and a decoder Md. The encoder Me is a processing unit configured to encode the input image Di to a latent variable in a multi-dimensional latent space LS that is a feature space. In other words, the encoder Me converts the input image Di into a latent variable. The latent variable is represented as a vector value having a component in each dimension of the latent space LS. The decoder Md is a processing unit configured to decode an image from a latent variable and output the re-constructed image Do approximate to the input image Di. Specifically, the decoder Md restores an image from a latent variable and generates the re-constructed image Do. For the encoder Me and the decoder Md, a multi-layer neural network is used.

In the latent space LS, one latent variable represents a feature of one input image Di. In the VAE model M, many input images Di are encoded such that a distribution of latent variables in the latent space LS forms a predetermined probability distribution. For the probability distribution, a normal distribution is used, for example.

Figure 4:
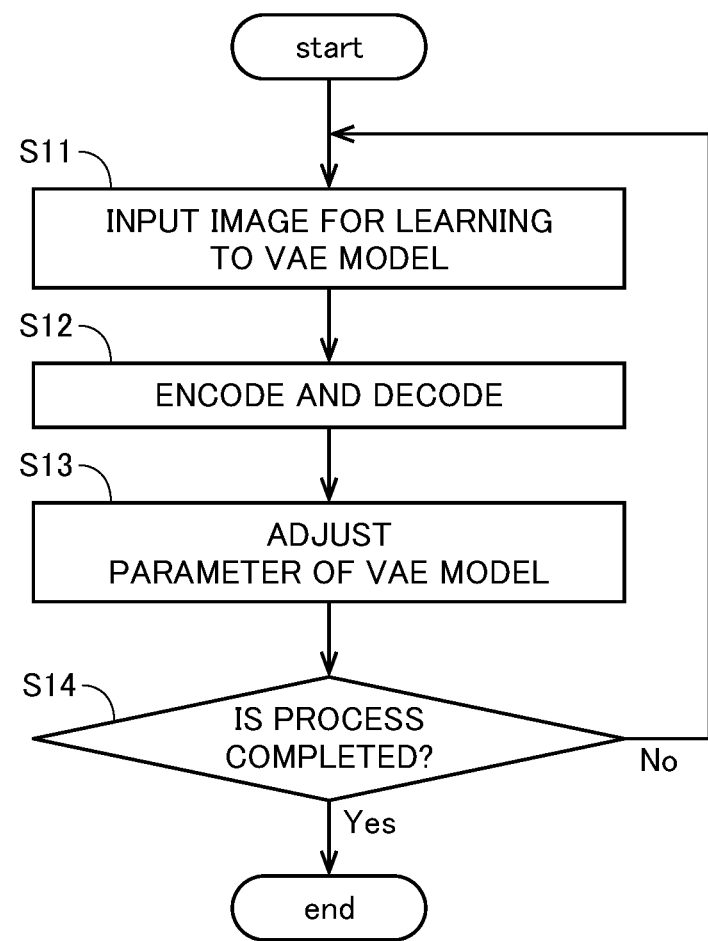
FIG. 4 is a flowchart showing a flow of a learning process.

FIG. 4 is a flowchart showing a flow of the learning process. The computer 20 inputs many input images Di of the object 9 for learning that are prepared in advance, to the VAE model M (step S11). Note that the input image Di is an image corresponding to a partial image D2 described later. Then, the VAE model M encodes and decodes each of the input images Di and outputs the re-constructed image Do (step S12).

The learning unit 41 of the computer 20 adjusts a parameter of the VAE model M such that a difference between the input images Di and the re-constructed image Do is reduced and a distribution of latent variables in the latent space LS forms the predetermined probability distribution described above (step S13). Specifically, a loss function Loss is represented by the following expression (1) in which MSE is an evaluation function representing a difference between the input images Di and the re-constructed image Do and KLD is an evaluation function representing an amount of deviation of the distribution of latent variables in the latent space LS from the predetermined probability distribution. Then, the learning unit 41 adjusts a parameter of the VAE model M so as to minimize the loss function Loss.

$$Loss = MSE + \beta \times KLD \qquad (1).$$

In the above-described expression (1), $\beta$ is a coefficient representing a weight of the evaluation function KLD in the loss function Loss. Weighting of the two evaluation functions MSE and KLD can be adjusted by a change of the coefficient II Thus, the loss function Loss can be further optimized, and the accuracy of the VAE model can be further improved.

The learning unit 41 repeats the processes in the steps S11 to S13 described above until a predetermined ending condition is satisfied (step S14). Consequently, the VAE model M that can accurately output the re-constructed image Do on the basis of the input images Di of the object 9 is constructed.

Note that the learning unit 41 may perform the above-described learning process again after constructing the VAE model M once, in order to update the VAE model M.

<3. Inspection Process>

Figure 5:
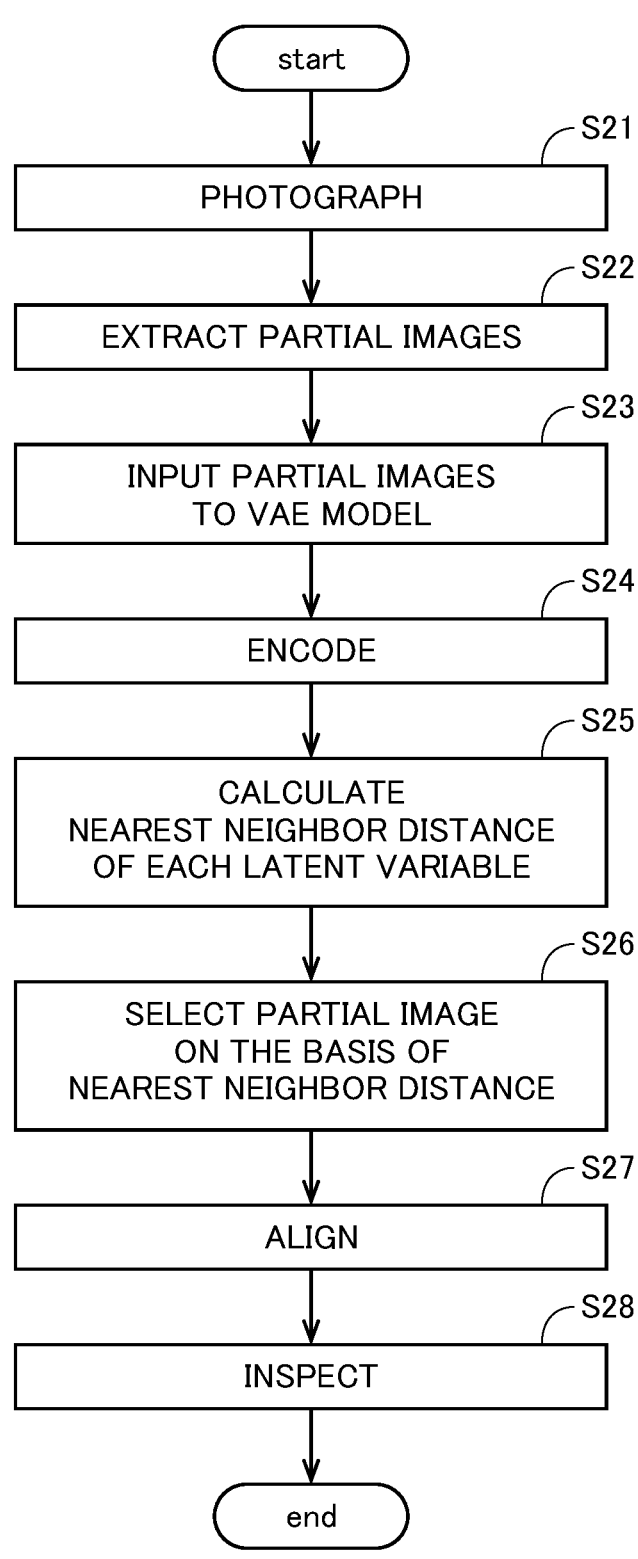
FIG. 5 is a flowchart showing a flow of an inspection process.

Next, an inspection process of the object 9 will be described. FIG. 5 is a flowchart showing a flow of the inspection process.

In inspecting the object 9, first, the image capture unit 10 photographs the object 9 (step S21). In the present embodiment, the image capture unit 10 photographs a part of the object 9 including the alignment mark 92. That is, the image capture unit 10 photographs a search range for searching for the alignment mark 92. As a result, the photographed image D1 including the alignment mark 92 and a part of the to-be-inspected pattern 91 present around the alignment mark 92 is acquired. The image capture unit 10 inputs the acquired photographed image D1 to the computer 20.

Subsequently, the partial-image extraction unit 42 of the computer 20 extracts a plurality of partial images D2 smaller than the photographed image D1, from the photographed image D1 (step S22). The step S22 is an example of a "partial-image extraction step" in the present invention. The partial images D2 are images that are candidates for an image including the alignment mark 92.

The alignment mark 92 is typically cross-shaped or rectangular, and includes a right-angled corner. Thus, in the present embodiment, the partial-image extraction unit 42 extracts a corner in the photographed image D1, first. Then, the partial-image extraction unit 42 extracts an image of a predetermined size centered at the corner, as each of the partial images D2.

The partial-image extraction unit 42 extracts a corner in the photographed image D1 by using Harris corner detection algorithm, for example. However, the partial-image extraction unit 42 may extract the partial images D2 including a characteristic shape such as a circular shape or a wiring pattern, in addition to a corner. Further, the partial-image extraction unit 42 may use another feature detection algorithm such as SIFT, SURF, or ORB, instead of Harris corner detection algorithm.

In the present embodiment, the partial images D2 are cut out from all areas of the photographed image D1, but are extracted from only areas including a corner of the photographed image D1. In this manner, the number of partial images D2 that are candidates for an image including the alignment mark 92 can be reduced. This leads to reduction of the number of partial images D2 to be input to the VAE model M in a later step S23. Consequently, the processes in the steps S23 to S26 can be speeded up.

The encoding unit 43 of the computer 20 inputs the plurality of extracted partial images D2 to the VAE model M (step S23). Then, the VAE model M encodes the plurality of partial images D2 (step S24). The steps S23 and S24 are an example of an "encoding step" in the present invention. As a result, the plurality of partial images D2 are converted into a plurality of latent variables in the multi-dimensional latent space LS. As described above, in the latent space LS, the plurality of latent variables are distributed according to the predetermined probability distribution such as a normal distribution. The partial images D2 having similar features are converted into latent variables near to each other in the latent space LS by being encoded.

Figure 6:
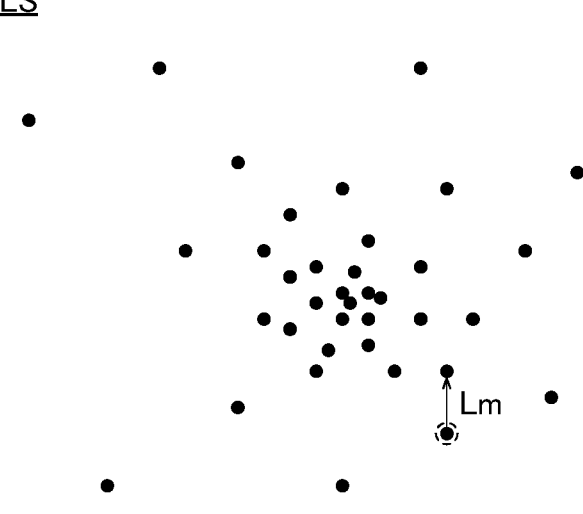
FIG. 6 is a view conceptually showing an example of a distribution of latent variables in a latent space.

Subsequently, the nearest neighbor distance calculation unit 44 of the computer 20 calculates a nearest neighbor distance Lm for each latent variable in the latent space LS (step S25). The nearest neighbor distance Lm is a distance to the nearest one of the other latent variables. FIG. 6 is a view conceptually showing an example of a distribution of latent variables in the latent space LS. In the example of FIG. 6, a certain latent variable in the latent space LS is enclosed with a broken line, and the nearest neighbor distance Lm of the certain latent variable is indicated by an arrow. The nearest neighbor distance calculation unit 44 calculates the nearest neighbor distance Lm described above for each of all the latent variables.

When the nearest neighbor distance Lm of a certain latent variable is small, it means that another latent variable is present near the certain latent variable in the latent space LS. This indicates the presence of the partial image D2 having a feature similar to a feature of the partial image D2 corresponding to the certain latent variable. Conversely, when the nearest neighbor distance Lm of a certain latent variable is large, it means that there is no latent variable near the certain latent variable in the latent space LS. This indicates the absence of the partial image D2 having a feature similar to a feature of the partial image D2 corresponding to the certain latent variable.

The image selection unit 45 of the computer 20 selects the partial images D2 that are likely to include the alignment mark 92 from the plurality of partial images D2 on the basis of the nearest neighbor distance Lm calculated in the step S25 (step S26). The steps S25 and S26 are an example of an "image selection step" in the present invention. The image selection unit 45 selects, for example, a predetermined number of partial images D2 corresponding to a predetermined number of latent variables each having the nearest neighbor distance Lm larger than those of the other latent variables, as the partial images D2 that are likely to include the alignment mark 92. The number of the partial images D2 to be selected can be set to five, for example. Then, the image selection unit 45 displays the predetermined number of selected partial images D2 on the display unit 30. At that time, the predetermined number of partial images D2 may be displayed on the display unit 30 while being sorted in a descending order of the nearest neighbor distance Lm thereof.

An operator designates the partial image D2 including the alignment mark 92 from the predetermined number of partial images D2 displayed on the display unit 30, and inputs the designated partial image D2 to the computer 20. Thus, the operator can identify the alignment mark 92 more easily as compared to a case in which the alignment mark 92 is searched for from scratch.

Note that the image selection unit 45 may select only one partial image D2 corresponding to one latent variable having the nearest neighbor distance Lm larger than those of the other latent variables, as the partial image D2 that is likely to include the alignment mark 92. In such a case, the operator may check the selected partial image D2 on the display unit 30 and provide an input as to whether the selection of the partial image D2 by the image selection unit 45 is correct, to the computer 20.

In a case in which an alignment mark is detected in each of two or more regions in the surface of the object 9, the computer 20 performs the processes of the steps S21 to S26 described above on each of the two or more regions. Thus, the computer 20 can select the partial image D2 including the alignment mark 92 in each region.

As described above, the inspection apparatus 1 inputs the plurality of partial images D2 to the VAE model M, and selects the partial images D2 that are likely to include the alignment mark 92 on the basis of a distribution of a plurality of latent variables in the latent space LS. In this manner, the partial image D2 including the alignment mark 92 can be automatically detected by the computer 20. Therefore, a burden on the operator who searches for the alignment mark 92 can be lightened.

It is notable that, in the present embodiment, the partial images D2 are selected on the basis of the nearest neighbor distance Lm of each latent variable in the latent space LS. Hence, the partial images D2 having few similar features can be selected. Therefore, the alignment mark 92 having a feature different from that of the to-be-inspected pattern 91 can be appropriately detected.

After that, the alignment unit 46 of the computer 20 aligns the object 9 on the basis of the selected partial image D2 (step S27). In the step S27, the alignment unit 46 identifies a position of the alignment mark 92 included in the selected partial image D2 by image processing. Then, the alignment unit 46 aligns the object 9 on the basis of the identified position of the alignment mark 92.

The alignment of the object 9 is achieved by fine adjustment of the position of the object 9 relative to the camera 11, for example. To this end, the object 9 may be moved, or the camera 11 may be moved.

When the alignment is completed, the inspection unit 47 of the computer 20 inspects the object 9 (step S28). Specifically, a predetermined inspection range that is set with respect to the alignment mark 92 in the surface of the object 9 is photographed by the camera 11. Then, on the basis of the acquired photographed image, it is inspected whether the to-be-inspected pattern 91 of the object 9 is defective.

The inspection unit 47, for example, compares the photographed image with a reference image prepared in advance, to detect a defect. Alternatively, the inspection unit 47 may input a photographed image to the above-described VAE model M, to detect a defect of the to-be-inspected pattern 91 on the basis of a difference between the photographed image and a re-constructed image. The inspection unit 47 displays a result of the inspection on the display unit 30.

<4. Modifications>

Hereinabove, one preferred embodiment of the present invention has been described, but the present invention is not limited to the above-described preferred embodiment. Below, there will be given description of various modifications, focusing on differences from the above-described preferred embodiment.

<4-1. First Modification>

In the above-described preferred embodiment, the partial image D2 that is not similar in feature to any of the other partial images D2 is estimated as the partial image D2 including the alignment mark 92, on the basis of the nearest neighbor distance Lm of a latent variable in the latent space LS of the VAE model M. However, according to this method, in a case in which the object 9 has an inherent defect such as a probe mark, a flaw, or a particle, the partial image D2 including such a defect may probably be selected in the above-described step S25.

Figure 7:
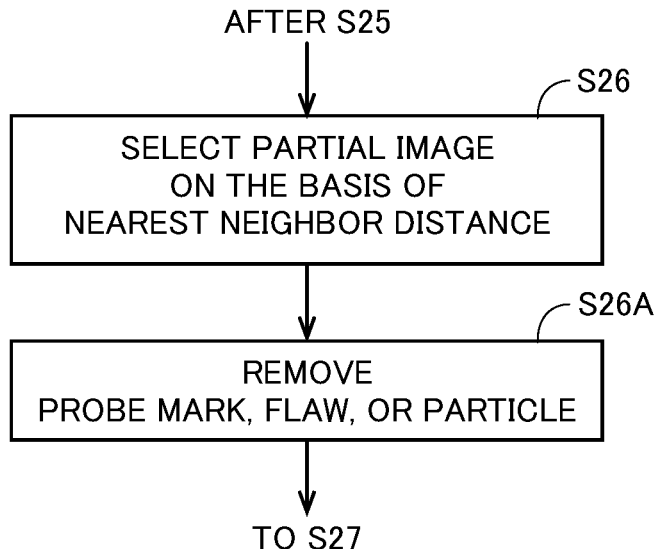
FIG. 7 is a flowchart showing a flow of an inspection process according to a first modification.

In order to prevent such erroneous detection, a step of removing the partial image D2 including a probe mark, a flaw, or a particle (step S26A) may be added as shown in FIG. 7. In the step S26A, for example, the partial image D2 including a probe mark, a flaw, or a particle can be removed from the plurality of partial images D2 by a classifier created by supervised machine learning.

The classifier is a learned model in which the partial image D2 is an input and a result of classification of the partial image D2 according to the presence or absence of a probe mark, a flaw, or a particle is an output. For the classifier, it is only required to cause a learning model capable of supervised machine learning to learn the already-known partial image D2 in which a probe mark, a flaw, or a particle is present and the already-known partial image D2 in which a probe mark, a flaw, or a particle is not present, in advance.

In this manner, it is possible to prevent the partial image D2 including a probe mark, a flaw, or a particle from being erroneously detected as the partial image D2 including the alignment mark 92. Therefore, the accuracy of detecting the alignment mark 92 can be further improved.

Note that the step S26A is performed after the step S26 in the example of FIG. 7, but the step 26A may be performed before the step S26.

<4-2. Second Modification>

In the above-described preferred embodiment, the partial image D2 including the alignment mark 92 is selected on the basis of a distribution of latent variables in the multi-dimensional latent space LS. In this process, too large a dimensionality of the latent space LS will make a period of time taken for the process long. Then, the dimensionality of the latent space LS may be adjusted by the following procedure.

Figure 8:
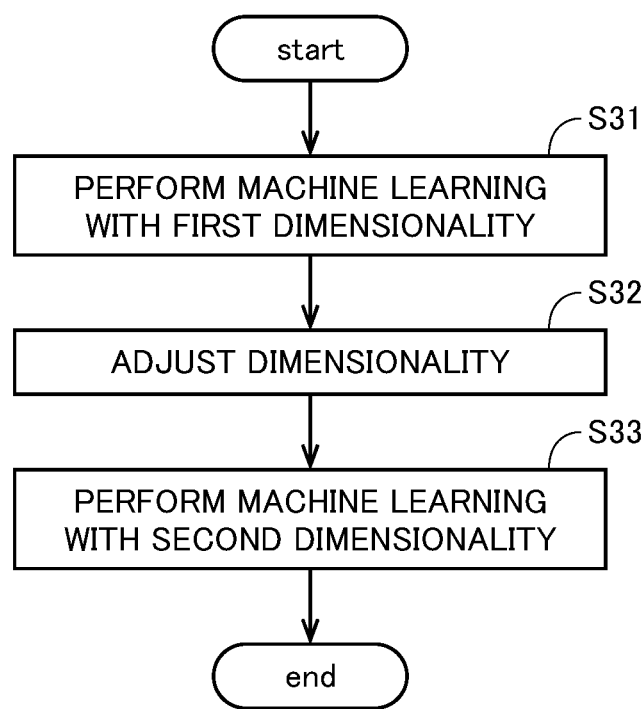
FIG. 8 is a flowchart showing a flow of a learning process according to a second modification.

FIG. 8 is a flowchart showing a procedure for performing the learning process while adjusting the dimensionality of the latent space LS. In the example of FIG. 8, first, the learning unit 41 performs machine learning with a first dimensionality being set as the dimensionality of the latent space LS (step S31, a pre-adjustment learning step). In the step S31, the same processes as the steps S11 to S14 in FIG. 4 described above are performed. As a result, the VAE model M is once constructed. The first dimensionality is a dimensionality that allows re-construction of an image with sufficient accuracy, and is supposed to be, for example, 512 dimensions.

Secondly, the learning unit 41 changes the dimensionality of the latent space LS from the first dimensionality to a second dimensionality smaller than the first dimensionality on the basis of a distribution of latent variables in each dimension of the latent space LS (step S32, a dimensionality adjustment step). As described above, a latent variable is represented as a vector value having a component in each dimension of the latent space LS. In the step S32, variance of a plurality of latent variables in the latent space LS is calculated for each component.

Figure 9:
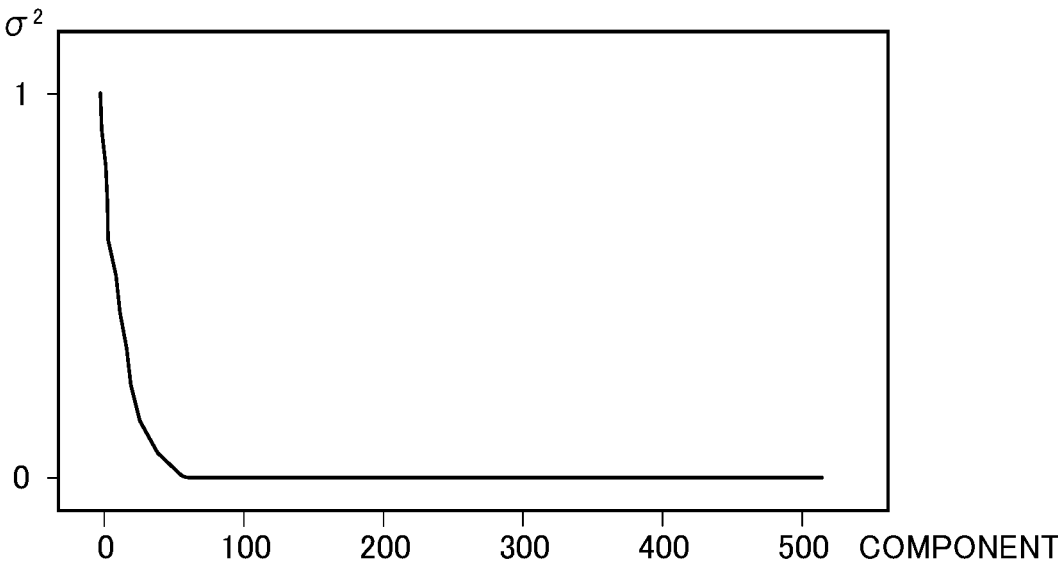
FIG. 9 is a graph showing an example of a result of calculation of variance of a plurality of latent variables for each component.

FIG. 9 is a graph showing an example of a result of the calculation of variance of the plurality of latent variables for each component. The horizontal axis of FIG. 9 represents a component in each dimension of the latent space LS. The vertical axis of FIG. 9 represents a value of variance. The graph of FIG. 9 shows components that are sorted in a descending order of a value of variance. In the example of FIG. 9, the number of components yielding a value of variance larger than zero is 64 or smaller. Hence, it is considered that the number of components that substantially capture the feature of the partial image D2 is 64 or smaller.

In the step S32, on the basis of the above-described calculation result of variance for each component, the dimensionality of the latent space LS is reduced. For example, in the example of FIG. 9, regarding the dimensionality of the latent space LS, 64 dimensions that include components substantially capturing the feature of the partial image D2 and are smaller than the first dimensionality are used as the second dimensionality. Thus, the dimensionality of the latent space LS can be optimized. Note that, in the process of the step S32, standard deviation may be used instead of variance described above.

After that, the learning unit 41 performs machine learning with the second dimensionality being set as the dimensionality of the latent space LS (step S33, a post-adjustment learning step). In the step S33, the same processes as the steps S11 to S14 in FIG. 4 described above are performed. As a result, the VAE model M is re-constructed. In this manner, the VAE mode M with an optimized dimensionality can be constructed. Therefore, the processes of the above-described steps S23 to S26 can be further speeded up.

<4-3. Third Modification>

Meanwhile, in order to improve the accuracy of feature extraction in the VAE model M, the input image Di during learning may be processed as follows.

Figure 10:
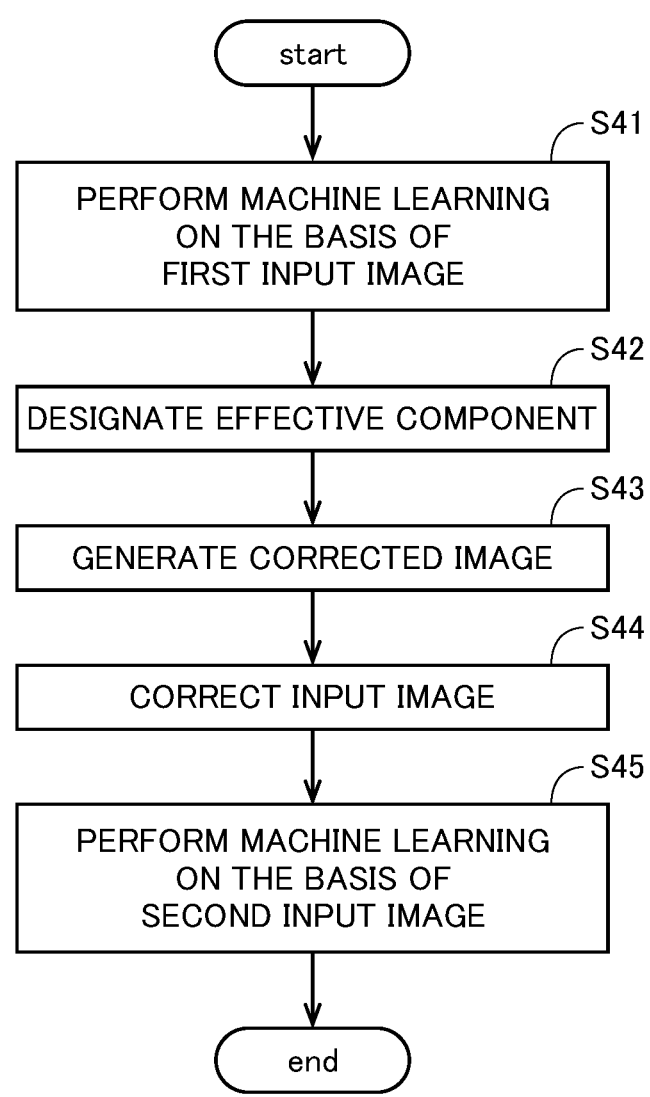
FIG. 10 is a flowchart showing a flow of a learning process according to a third modification.

FIG. 10 is a flowchart showing a procedure for learning in a case in which the input image Di is processed. Hereinafter, the input image Di that is yet to be processed will be referred to a first input image Di1. In the example of FIG. 10, first, the learning unit 41 performs machine learning on the basis of the first input image Di1 (step S41, a first learning step). In the step S41, the same processes as the steps S11 to S14 in FIG. 4 described above are performed. As a result, the VAE model M is once constructed.

Secondly, in the constructed VAE model M, the learning unit 41 calculates variance or standard deviation of a plurality of latent variables in the latent space LS for each component in the same manner as in the above-described step S32. Then, a predetermined number of effective components are designated from among a plurality of components of the latent variables (step S42, an effective-component designation step). At that time, the learning unit 41 selects a predetermined number of components having large variance or standard deviation from the plurality of components of the latent variables, as the effective components. For the effective components, components ranked in the top 10 percent for having a large value of variance or standard deviation can be used, for example.

Subsequently, the learning unit 41 creates an effective vector. The effective vector is a vector that has a value only for each of the above-described effective components in the latent space LS. The effective vector is created by multiplication of a fundamental vector of each of the above-described effective components by a predetermined value of one or larger, for example. Then, the learning unit 41 decodes the effective vector with the use of the decoder Md of the VAE model M, to generate a corrected image (step S43, a corrected-image generation step).

Subsequently, the learning unit 41 blends the first input image Di1 with the corrected image generated in the step S43. As a result, a second input image Di2 is generated (step S44, an input-image correction step). That is, the second input image Di2 corresponds to the corrected input image Di. The learning unit 41 blends the first input image Di1 with the corrected image using, for example, an a blending method. Alternatively, the learning unit 41 may blend the first input image Di1 with the corrected image using methods other than an a blending method. The generated second input image Di2 is an image in which a characteristic element of the first input image Di1 is emphasized.

After that, the learning unit 41 performs machine learning on the basis of the second input image Di2 (step S45, a second learning step). In the step S45, the same processes as the steps S11 to S14 in FIG. 4 described above are performed. As a result, the VAE model M is re-constructed. Thus, in the step S45, machine learning based on the second input image Di2 in which a characteristic element of the first input image Di1 is emphasized is performed. This enables construction of more accurate VAE model M. Therefore, the detection of the alignment mark 92 in the steps S23 to S26 described above can be performed with higher accuracy.

<4-4. Other Modifications>

In the above-described preferred embodiment, the image selection unit 45 selects the partial images D2 that are likely to include the alignment mark 92 on the basis of the nearest neighbor distance Lm. Alternatively, the image selection unit 45 may select the partial images D2 that are likely to include the alignment mark 92 by a method different from the method using the nearest neighbor distance Lm. For example, the image selection unit 45 may select the partial images D2 that are likely to include the alignment mark 92 on the basis of a density of latent variables around each latent variable.

Further, the above-described preferred embodiment has discussed an example in which the alignment mark 92 placed on the surface of the object 9 independently of a wiring pattern is detected. Alternatively, the mark detection method of the present invention may be one in which a pattern usable as an alignment mark is detected from among many patterns such as a wiring pattern placed on the object 9.

Further, the above-described preferred embodiment has discussed alignment in the inspection apparatus 1. Alternatively, the mark detection method of the present invention may be one in which an alignment mark is detected in any of other apparatuses than the inspection apparatus 1. For example, the mark detection method of the present invention may be one in which an alignment mark is detected from an object in an apparatus that performs exposure or drawing on the object.

Meanwhile, details of the above-described methods or apparatuses can be appropriately modified or partly omitted within a scope not departing from the gist of the present invention. Further, the respective elements described in the above-described preferred embodiment and modifications may be appropriately combined unless contradiction occurs.

<5. Other Points of View>

<5-1. First Point of View>

Note that, in a case in which "to detect a partial image that is likely to include an alignment mark while removing a partial image including a probe mark, a flaw, or a particle" is set as a primary task, an invention in which it is not essential to use a VAE model, but instead, an "image removal step" is essential, can be extracted from the above-described preferred embodiment and modifications.

The invention corresponds to, for example, "a mark detection method for detecting an alignment mark from an object, in which a computer performs an image selection step of selecting one or more partial images that are likely to include an alignment mark from a plurality of partial images of the object, and an image removal step of removing a partial image including a probe mark, a flaw, or a particle from the one or more partial images by using a classifier created by supervised learning".

According to this invention, a partial image including a probe mark, a flaw, or a particle can be prevented from being selected. This enables improvement of the accuracy of detecting an alignment mark. Further, this invention can be combined with the respective elements described in the above-described preferred embodiment and modifications.

<5-2. Second Point of View>

Further, in a case in which "to construct a VAE model capable of high-speed processing" is set as a primary task, an invention of a learning method in which only the "pre-adjustment learning step", the "dimensionality adjustment step", and the "post-adjustment learning step" are essential, can be extracted from the above-described preferred embodiment and modifications.

The invention corresponds to, for example, "a learning method for a VAE model, including a pre-adjustment learning step of performing machine learning with a first dimensionality being set as a dimensionality of a latent space of the VAE model, a dimensionality adjustment step of changing the dimensionality of the latent space to a second dimensionality smaller than the first dimensionality on the basis of a distribution of latent variables in each dimension of the latent space, after the pre-adjustment learning step, and a post-adjustment learning step of performing machine learning with the second dimensionality being set as the dimensionality of the latent space".

According to this invention, the dimensionality of the latent space can be adjusted to an appropriate dimensionality. This enables construction of a VAE model capable of high-speed processing. Further, this invention can be combined with the respective elements described in the above-described preferred embodiment and modifications.

<5-3. Third Point of View>

Further, in a case in which "to construct an accurate VAE model" is set as a primary task, an invention of a learning method in which only the "first learning step", the "effective-component designation step", the "corrected-image generation step", the "input-image correction step", and the "second learning step" are essential, can be extracted from the above-described embodiment and modifications.

The invention corresponds to, for example, "a learning method for a VAE model, including a first learning step of performing machine learning on the basis of a first input image, an effective-component designation step of designating a predetermined number of effective components having large standard deviation or variance from among a plurality of components of latent variables in a latent space, after the first learning step, a corrected-image generation step of decoding an effective vector having a value only for the effective component, to generate a corrected image, an input-image correction step of blending the first input image with the corrected image, to generate a second input image, and a second learning step of performing machine learning on the basis of the second input image".

According to this invention, the second input image in which a characteristic element of the first input image is emphasized can be generated. Then, by performing machine learning on the basis of the second input image, it is possible to construct an accurate VAE model. Further, this invention can be combined with the respective elements described in the above-described preferred embodiment and modifications.

While the invention has been shown and described in detail, the foregoing description is in all aspects illustrative and not restrictive. It is therefore understood that numerous modifications and variations can be devised without departing from the scope of the invention.

What is claimed is:

1. A mark detection method, executed by a computer, for detecting an alignment mark from an object, the method comprising steps of:

A) inputting a plurality of partial images of the object to a learned VAE model and encoding the plurality of partial images to a plurality of latent variables in a multi-dimensional latent space; and B) selecting one or more partial images that are likely to include the alignment mark based on a distribution of the plurality of latent variables in the latent space, wherein the step B) includes steps of:

a) calculating a distance from each of the latent variables to a nearest latent variable in the latent space; and b) selecting one or a predetermined number of partial images corresponding to one or a predetermined number of latent variables each having the distance larger than those of the other latent variables, as the one or more partial images that are likely to include the alignment mark.

2. The mark detection method according to claim 1, further comprising a step of

C) extracting a partial image including a characteristic shape from an image of the object, before the encoding step, and wherein in the step A), the partial image extracted in the partial-image extraction step is input to the VAE model.

3. The mark detection method according to claim 1, further comprising a step of

D) removing a partial image including a probe mark, a flaw, or a particle from the plurality of partial images by using a classifier created by supervised learning.

4. The mark detection method according to claim 1, further comprising a step of a learning step of constructing or updating the VAE model by machine learning, and wherein in the step E), an input image of the object for learning is input to the VAE model that encodes and decodes the input image to output a re-constructed image, and a parameter of the VAE model is adjusted such that a difference between the input image and the re-constructed image decoded from the latent variables is reduced and the distribution of the latent variables in the latent space forms a predetermined probability distribution.

5. The mark detection method according to claim 4, wherein the step E) includes the steps of:

c) performing machine learning with a first dimensionality being set as a dimensionality of the latent space;

d) changing the dimensionality of the latent space to a second dimensionality smaller than the first dimensionality on the basis of a distribution of the latent variables in each dimension of the latent space, after the pre-adjustment learning step; and e) performing machine learning with the second dimensionality being set as the dimensionality of the latent space.

6. The mark detection method according to claim 5, wherein, in the step d), the dimensionality of the latent space is reduced based on variance or standard deviation calculated for each component of the plurality of latent variables in the latent space.

7. The mark detection method according to claim 4, wherein the step E) includes steps of:

f) performing machine learning based on a first input image;

g) designating a predetermined number of effective components having large standard deviation or variance from among a plurality of components of the latent variables in the latent space, after the first learning step;

h) decoding an effective vector having a value only for the effective component, to generate a corrected image;

i) blending the first input image with the corrected image, to generate a second input image; and j) performing machine learning on the basis of the second input image.

8. A computer program that causes the computer to execute the mark detection method according to claim 1.

* * * * *